United States Patent [19]

Mang et al.

[11] Patent Number: 5,496,910
[45] Date of Patent: Mar. 5, 1996

[54] HYDROXYFUNCTIONAL THERMOPLASTIC POLYESTERS

[75] Inventors: Michael N. Mang; Jerry E. White; Paul E. Swanson, all of Midland, Mich.

[73] Assignee: The Dow Chemical Company, Midland, Mich.

[21] Appl. No.: 278,361

[22] Filed: Jul. 21, 1994

[51] Int. Cl.$^6$ .................................................. C08G 59/68
[52] U.S. Cl. .............................. 528/88; 528/112; 525/533
[58] Field of Search .................... 528/112, 88; 525/533

[56] References Cited

U.S. PATENT DOCUMENTS

| | | | |
|---|---|---|---|
| 3,305,528 | 2/1967 | Berkeley et al. | 528/89 |
| 3,850,862 | 11/1974 | Clendenning et al. | 528/99 |
| 4,128,515 | 12/1978 | Tobias et al. | 523/100 |
| 5,089,588 | 2/1992 | White et al. | 528/99 |
| 5,115,075 | 5/1992 | Brennan et al. | 528/99 |
| 5,134,218 | 7/1992 | Brennan et al. | 528/99 |
| 5,143,998 | 9/1992 | Brennan et al. | 528/99 |
| 5,149,768 | 9/1992 | White et al. | 528/89 |
| 5,171,820 | 12/1992 | Mang et al. | 528/87 |

FOREIGN PATENT DOCUMENTS 4124764  5/1992  Japan.

OTHER PUBLICATIONS

Encyclopedia of Polymer Science and Engineering, vol. 2, 2nd Ed., Biodegradable Polymers, Samuel J. Huang, pp. 220–243.

*Primary Examiner*—James J. Seidleck
*Assistant Examiner*—Terressa Mosley

[57] ABSTRACT

A biodegradable hydroxy-functional polyester is prepared by contacting a hydroxy-functional aliphatic dicarboxylic acid or a mixture of dicarboxylic acids containing hydroxy-functional aliphatic diacids, with a diglycidyl ether or diglycidyl ester in the presence of an onium catalyst in an ether solvent under conditions suitable for forming the polyester.

15 Claims, No Drawings

HYDROXYFUNCTIONAL THERMOPLASTIC POLYESTERS

BACKGROUND OF THE INVENTION

This invention relates to biodegradable polyesters and to articles prepared from such polymers.

Biodegradable polyesters of both natural and synthetic origins are well known. See for example, *Encyclopedia of Polymer Science and Technology*, Second Edition, Volume 2, pp. 220–243. However, these known biodegradable polyesters have several limitations which render them unsuitable for many intended applications. For example, biodegradable polyesters of natural origin which are isolated as products of fermentation processes require extensive separation and purification in order to provide a product of purity suitable for typical plastic uses. These polymers also have generally poor physical properties and are difficult to fabricate into useful articles. Synthetic biodegradable polyesters are also known. Although these synthetic polyesters do not have the separation and purification problems associated with natural materials, they often suffer from the deficiencies in mechanical properties and fabricatability encountered in natural biodegradable polymers.

Synthetic thermoplastic polyesters can be prepared from the reactions of difunctional acids and alcohols. These diacids and dialcohols are generally derived from petroleum-based sources, whose prices are subject to extreme fluctuation on the world market. It would be desirable to make use of raw materials derived from renewable resources such as the products of agriculture, for the production of new plastic materials. Dicarboxylic acids derived from plants, such as tartaric acid from grapes, or malic acid from apples, could be useful for such purposes, except that these particular diacids also contain hydroxyl groups.

It is well known in the art of polyester synthesis that the use of reactants that contain more than two reactive-functional groups per molecule, as is found in the above-mentioned plant-derived acids, will lead first to branching, and then to gelation and crosslinking. Thus, preparation of thermoplastics from hydroxy-functional diacids are only possible if a suitable protecting group is employed to prevent reaction of the hydroxyl moieties during the polymerization. Deprotection of the hydroxyl groups provides a hydroxyl-functional polyester. However, this process requires the use of costly reagents, and additional undesirable separation and purification processes to provide a product suitable for use as a practical plastic material.

It would be desirable to provide synthetic thermoplastic polyesters derived from hydroxy-functional dicarboxylic acids, and to provide useful articles from such polyesters that are biodegradable.

SUMMARY OF THE INVENTION

In one aspect, the present invention is a hydroxy-functional polyester comprising moieties derived from hydroxy-functional aliphatic diacids and diglycidyl ethers or diglycidyl esters.

In another aspect, this invention is a process for preparing a hydroxy-functional polyester which comprises contacting a hydroxy-functional aliphatic dicarboxylic acid or a mixture of dicarboxylic acids containing hydroxy-functional aliphatic diacids, with a diglycidyl ether or diglycidyl ester in the presence of an onium catalyst in an ether solvent under conditions suitable for forming the polyester.

In another aspect, this invention is a biodegradable article comprising a hydroxy-functional polyester derived from hydroxy-functional aliphatic diacids and diglycidyl ethers or diglycidyl esters.

DETAILED DESCRIPTION OF THE INVENTION

Definitions

The following terms are used in this application and have the meanings and preferred embodiments set out hereinafter unless otherwise specified.

As used herein, the term "aromatic moiety" means any group having one or more aromatic rings and from about 5 to about 25 carbon atoms. The aromatic rings may have one or more non-carbon atoms in the ring such as, for example, sulfur, nitrogen and oxygen, or one or more substituent groups bonded to the aromatic ring. These substituent groups may be alkyl, cycloalkyl, aryl, alkoxy, aryloxy, amido, halo, nitro, or cyano groups.

The term "hydrocarbylene" means a divalent aliphatic hydrocarbon moiety, such as alkylene, alkenylene or cycloalkylene having from 2 to 20 carbons and optionally containing a heteroatomic group, such as oxygen, sulfur, imino, sulfonyl, carboxyl, carbonyl or sulfoxyl, in the chain or pendant thereto.

As used herein, the term "hydroxy-functional aliphatic diacid" means a compound generally represented by the formula:

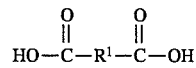

wherein $R^1$ is a hydrocarbylene substituted with at least one hydroxyl group, optionally in combination with an unsubstituted hydrocarbylene or an unsubstituted divalent aromatic moiety.

The term "diglycidyl ether" means a compound generally represented by the formula:

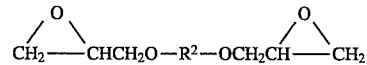

wherein $R^2$ is a divalent aromatic moiety or a hydrocarbylene.

The term "diglycidyl ester" means a compound generally represented by the formula:

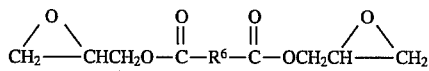

wherein $R^6$ is a divalent aromatic moiety, or a hydrocarbylene optionally substituted with at least one hydroxyl group.

The term "biodegradable" means that the articles, when exposed to a biologically active environment, suffer from substantial changes in mechanical properties or molecular weight, or provide a source of nutrients that will support the growth of microorganisms. Illustrative biologically active environments include soil, aquatic and marine environments, composting systems, activated sewage sludge, and the like. Hydrolytic and photochemical degradative processes and the like may be operative in such biologically active environments, and other conditions such as temperature, moisture level, pH, ionic strength, aeration, distribution of microbial population and polymer morphology, are well known to affect the rate and the nature of the degradative process.

The biodegradability of plastics can be measured using several different methods. Articles, for example molded films or bars, can be exposed to a biologically active environment, and samples removed periodically for mechanical or molecular weight characterization. The plastic material can be placed into a vessel containing a culture of microorganisms, and the products of cellular metabolism, such as carbon dioxide, can be measured to characterize the metabolism of the material. Alternatively, a culture of microorganisms, in a medium containing all nutrients needed for cellular growth except for carbon, can be supplied with a plastic material. Cell growth indicates that the polymer is being used for the metabolic processes of the cells.

The biodegradable hydroxy-functional polyester of the present invention has repeating units represented by the formula:

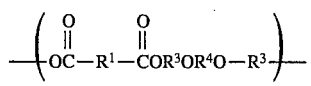

wherein $R^1$ is as defined before; $R^3$ is

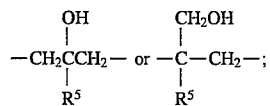

and $R^4$ is

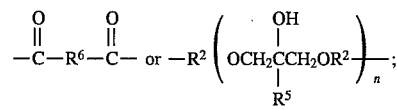

wherein $R^1$, $R^2$, and $R^6$ are as defined before; $R^5$ is hydrogen or lower alkyl; and n is from 0 to 1000.

In the more preferred polymers, $R^1$ is (1) alkylene, cycloalkylene, alkenylene, alkyleneoxyalkylene, alkylenethioalkylene, or alkylenesulfonylalkylene, substituted with at least one hydroxyl group and, optionally, combined with (2) arylene, alkylenearylene, dialkylenearylene, diaryleneketone, diarylenesulfone, diarylenesulfoxide, alkylidene-diarylene, diarylene oxide or diarylene sulfide; or another alkylene, cycloalkylene, alkenylene, alkyleneoxyalkylene, alkylenethioalkylene or alkylenesulfonylalkylene; and n is from 0 to 100.

In the most preferred polymers, $R^1$ is hydroxymethylene, hydroxyethylene, dihydroxyethylene, hydroxypropylene, dihydroxypropylene, trihydroxypropylene, hydroxymethylethylene, hydroxybutylene, dihydroxybutylene, trihydroxybutylene, or tetrahydroxybutylene; and n is from 0 to 10.

In the preferred polymers, $R^2$ is (1) a divalent aromatic moiety such as arylene, alkylenearylene, dialkylenearylene, diaryleneketone, diarylenesulfone, diarylenesulfoxide, alkylidene-diarylene, diarylene oxide, diarylene sulfide, or (2) a hydrocarbylene such as alkylene, cycloalkylene, alkenylene, alkyleneoxyalkylene, alkylenethioalkylene, or alkylenesulfonylalkylene. In the most preferred polymers, $R^2$ is m-phenylene, p-phenylene, napthylene, diphenylene-isopropylidene, ethylene, propylene, butylene, hexylene, octylene, decylene, or cyclohexylene.

In the preferred polymers, $R^6$ is (1) a divalent aromatic moiety such as arylene, alkylenearylene, dialkylenearylene, diaryleneketone, diarylenesulfone, diarylenesulfoxide, alkylidene-diarylene, diarylene oxide, diarylene sulfide, or (2) a hydrocarbylene such as alkylene, cycloalkylene, alkenylene, alkyleneoxyalkylene, alkylenethioalkylene, or alkylenesulfonylalkylene, optionally substituted with at least one hydroxyl group. In the more preferred polymers, $R^6$ is m-phenylene, p-phenylene, naphthylene, diphenylene-isopropylidene, ethylene, propylene, butylene, hexylene, octylene, decylene, cyclohexylene, hydroxymethylene, hydroxyethylene, dihydroxyethylene, hydroxypropylene, dihydroxypropylene, trihydroxypropylene, hydroxymethylethylene, hydroxybutylene, dihydroxybutylene, trihydroxybutylene, and tetrahydroxybutylene. In the most preferred polymers, $R^6$ is m-phenylene, p-phenylene, ethylene, propylene, butylene, hexylene, octylene, decylene, or cyclohexylene.

In the preferred polymers, $R^5$ is hydrogen, and n is from about 0 to about 10.

Generally, the polymers of the present invention can be prepared by reacting a hydroxy-functional aliphatic diacid, optionally in the presence of another diacid, with a diglycidyl ether or diglycidyl ester or a mixture of diglycidyl ethers or diglycidyl esters at conditions sufficient to cause the acid moieties to react with the epoxy moieties to form a polymer backbone having ester linkages. The polymers can be prepared by well-known methods such as, for example, those described in U.S. Pat. No. 5,171,820, incorporated herein by reference.

Hydroxy-functional aliphatic diacids which can be employed in the practice of the present invention are those aliphatic diacids which can react with a diglycidyl ether or diglycidyl ester to prepare a biodegradable polymer. Suitable diacids include, for example, tartaric, malic, citramalic and hydroxyglutaric acids. Of these diacids, tartaric acid and malic acid are most preferred.

Diglycidyl ethers which can be employed in the practice of the present invention are those diglycidyl ethers which can react with hydroxy-functional aliphatic diacids to prepare a biodegradable polymer. Suitable diglycidyl ethers include, for example, the diglycidyl ethers of 9,9-bis(4-hydroxyphenyl)fluorene, hydroquinone, resorcinol, 4,4'-sulfonyldiphenol, 4,4'-thiodiphenol, 4,4'-oxydiphenol, 4,4'-dihydroxybenzophenone, 4,4'-biphenol, bis(4-hydroxyphenyl)-methane, 2,6-dihydroxynaphthalene and 4,4'-isopropylidene bisphenol (bisphenol A). The more preferred diglycidyl ethers include the diglycidyl ethers of 9,9-bis(4-hydroxyphenyl)fluorene, hydroquinone, resorcinol, bis(4-hydroxyphenyl)-methane, and bisphenol A. The most preferred diglycidyl ethers include the diglycidyl ethers of 9,9-bis(4-hydroxyphenyl)fluorene, hydroquinone, resorcinol and bisphenol A.

Diglycidyl esters which can be employed in the practice of the present invention are those diglycidyl esters which can react with hydroxy-functional aliphatic diacids to prepare a biodegradable polymer. Suitable diglycidyl esters include, for example, the diglycidyl esters of terephthalic acid, isophthalic acid, 2,6-naphthalenedicarboxylic acid, 3,4'-biphenyldicarboxylic acid, 4,4'-biphenyldicarboxylic acid, malonic acid, succinic acid, glutaric acid, adipic acid, pimelic acid, suberic acid, azaleic acid, sebacic acid, 1,4-cyclohexanedicarboxylic acid, 1,10-decanedicarboxylic acid, tartaric acid, malic acid, citramalic acid, and hydroxyglutaric acid. The more preferred diglycidyl esters which can be employed in the practice of the present invention for preparing the biodegradable hydroxy-functional polyester include the diglycidyl esters of terephthalic acid, isophthalic acid, adipic acid, 1,4-cyclohexanedicarboxylic acid and 1,10-decanedicarboxylic acid.

In general, the reaction of the diacid and diglycidyl ether or ester requires a catalyst or any material capable of catalyzing the reaction. While any material capable of catalyzing the reaction can be used, the preferred catalytic materials are the onium catalysts. Preferred onium catalysts include tetrahydrocarbyl quaternary ammonium halides and tetrahydrocarbyl phosphonium halides, wherein hydrocarbyl is a monovalent hydrocarbon radical such as alkyl, aryl, cycloalkyl, aralkyl and alkaryl, preferably having from 1 to 16 carbon atoms. More preferred onium catalysts include ethyltriphenylphosphonium iodide, tetraphenylphosphonium bromide, and tetrakis(n-butyl) ammonium bromide and its corresponding chloride, iodide and fluoride, with tetrakis(n-butyl) ammonium bromide being the most preferred.

The polymers of this invention contain moieties derived from the hydroxy-functional aliphatic diacids described above, or can contain one or more other diacids copolymerizable with the hydroxy-functional aliphatic diacids. Illustrative of such other diacids include terephthalic acid, isophthalic acid, 2,6-naphthalene-dicarboxylic acid, 3,4'-biphenyldicarboxylic acid, 4,4'-biphenyldicarboxylic acid, malonic acid, succinic acid, glutaric acid, adipic acid, pimelic acid, suberic acid, azelaic acid, sebasic acid, 1,4-cyclohexanedicarboxylic acid and 1,10-decanedicarboxylic acid. More preferred diacids are terephthalic acid, isophthalic acid, adipic acid, 1,4-cyclohexanedicarboxylic acid and 1,10-decanedicarboxylic acid. The other diacids can be present in an amount up to about 95 mole percent based on hydroxy-functional aliphatic diacids.

The conditions at which the reaction is most advantageously conducted are dependent on a variety of factors, including the specific reactants, solvent, and catalyst employed but, in general, the reaction is conducted under a non-oxidizing atmosphere such as a blanket of nitrogen, preferably at a temperature from about 50° C. to about 190° C. The reaction can be conducted neat (without solvent or other diluents). However, in order to ensure homogeneous reaction mixtures at such temperatures, it is often desirable to use inert organic solvents for the reactants. Examples of suitable solvents include ethers such as glyme, diglyme, triglyme, dioxane or tetrahydrofuran.

In some cases, it may be desirable to end-cap residual epoxy groups or control molecular weight with monofunctional reactants (compounds having one reactive group) such as carboxylic acids, thiols, monofunctional sulfonamides and monohydric phenols. Preferred monofunctional reactants include acetic acid, benzoic acid, thiophenol, N-methylbenzenesulfonamide, phenol and tert-butylphenol.

The hydroxy ester polymers are recovered from the reaction mixture by conventional methods. For example, the polymer can be isolated from a reaction mixture containing a suitable solvent by precipitation into a non-solvent such as water, or the solvent can be removed by vacuum or a devolatilizing extruder.

The polymers of the present invention are processable as thermoplastics. The article can be reheated and reformed any desired number of times, and the polymer does not undergo crosslinking or network formation during this handling. A test for crosslinking can be made by contacting the material with a solvent, preferably after exposure to the temperatures encountered during thermoplastic processing. Crosslinked materials will not be dissolved, while uncrosslinked materials will be dissolved by the solvent. Thermoplastics can be extruded at temperatures above their glass transition temperatures or they can be compression molded into films or plaques, or injection or blow molded into articles or containers and they remain both soluble and processable after such thermal treatment.

Molded or foamed articles, containers, films or coatings can be fabricated from the polyesters of the present invention using conventional fabricating techniques for normally solid thermoplastic polymers such as extrusion, compression molding, injection molding and similar fabrication techniques commonly employed to produce such articles.

The following working examples are given to illustrate the invention and should not be construed as limiting its scope. Unless otherwise indicated, all parts and percentages are by weight.

EXAMPLE 1

A 100 mL mini reactor, equipped with a mechanical stirrer, nitrogen inlet, and condenser, is charged with bisphenol A diglycidyl ether (10.453 g, 30.6 mmol, 172.38 g/equiv. E.E.W.), L-tartaric acid (4.590 g, 30.6 mmol), and tetra-n-butylammonium bromide (4.00 g, 12.5 mmol). Dioxane (35 mL) is added under a stream of nitrogen and the mixture heated to reflux for 4.5 hours. Glacial acetic acid (4 mL) is added and heating at reflux continued for 1 hour. The mixture is diluted with dimethylformamide (DMF, 30 mL), and the product isolated by precipitation into water (500 mL) in a Waring blender. The product is collected by suction filtration and dried in a vacuum oven at 80° C. overnight. The product obtained (14.2 g) has an inherent viscosity of 0.32 dL/g, measured in DMF at 25° C., at a concentration of 0.5 g/dL, and a glass transition temperature of 71° C.

EXAMPLE 2

A series of copolymers derived from varying ratios of tartaric acid and isophthalic acid and bisphenol A diglycidyl ether is prepared in the manner described in the above example. The inherent viscosities and thermal properties are listed in Table I.

TABLE I

| Example | mol % Isophthalic | mol % L-Tartaric | Inherent Viscosity[1] (dL/g) | $T_g$[2] (°C.) |
| --- | --- | --- | --- | --- |
| Comparative Ex. A[3] | 100 | 0 | 0.50 | 97 |
| Example 2A | 90 | 10 | 0.40 | 73 |
| Example 2B | 75 | 25 | 0.40 | 91 |
| Example 2C | 50 | 50 | 0.26 | 87 |
| Example 1 | 0 | 100 | 0.32 | 71 |

[1]Inherent Viscosity in DMF at 0.5 g/dL and 25° C.
[2]Glass transition temperature determined using a DuPont Model 2100 differential scanning calorimeter (DSC) operation in a heating mode at 10° C./min. Glass transitions are calculated from the inflection point in the plot of heat capacity versus temperature.
[3]Comparative example polymer prepared as described in U.S. Pat. No. 5,171,820.

Biodegradability Tests

The biodegradability of the polymers prepared in Examples 1 and 2 is evaluated by monitoring the growth of a consortium of soil microorganisms in a liquid culture medium over a six-week time period. Under aerobic conditions, the microorganisms are provided samples of the above polymer compositions as a sole source of carbon in addition to all inorganic nutrients required for their growth. The culture medium contains, per liter: potassium phosphate, dibasic (1.55 g), sodium phosphate, monobasic monohydrate (0.85 g), ammonium sulfate (2.0 g), sodium nitrate (2.0 g), magnesium chloride hexahydrate (0.1 g), disodium EDTA (0.5 mg), ferrous sulfate heptahydrate (0.2 mg), zinc sulfate heptahydrate (0.01 mg), manganese chloride tetrahydrate (0.03 mg), boric acid (0.03 mg), cobalt chloride hexahydrate (0.02 mg), calcium chloride dihydrate (0.001 mg), nickel chloride hexahydrate (0.002 mg), and sodium molybdate dihydrate (0.003 mg). Also added is a 100:1 dilution of a vitamin mixture containing per liter: biotin (0.2 mg), folic acid (0.2 mg), pyridoxin (1.0 mg), thiamine hydrochloride (0.5 mg), riboflavin (0.5 mg), nicotinic acid (0.5 mg), D,L-calcium pantothenate (0.5 mg), cyanocobaltamin (B12, 0.01 mg), para-amino hydroxybenzoic acid (0.5 mg) and lipoic acid (0.5 mg).

The pH of the medium is adjusted to 7.0 prior to sterilization.

Weekly aliquots of the culture broth are serially diluted and plated onto a solid nutrient medium to assess the number of colony-forming units per unit volume. Control cultures without polymer, and with polymer compositions known to be poorly biodegradable (poly(ethylene terephthalate), PET) are run to illustrate the biodegradability of the compositions of the present invention. Table II shows the peak bacterial populations, expressed as colony-forming units per milliliter of culture broth, for the tested thermoplastic materials.

TABLE II

| Sample | Peak Bacteria/mL culture broth[1] | |
|---|---|---|
| | Replicate 1 | Replicate 2 |
| Blank[2] | 0.8–1.5 × 10$^7$ | 0.8–1.2 × 10$^7$ |
| Control[3] | 1.2–2.2 × 10$^7$ | 0.5–1.2 × 10$^7$ |
| Example 1 | 6.0–7.0 × 10$^7$ | 6.0–8.0 × 10$^7$ |
| Example 2B | 3.4–3.7 × 10$^8$ | 0.8–1.1 × 10$^8$ |

[1]Listed as peak value measured over six weeks incubation, as the range found in triplicate measurements, for each two separate cultures for each material tested.
[2]No carbon source in culture medium.
[3]Poly(ethylene terephthalate).

The data shown in Table II illustrate that cultures containing no polymer (blank) or cultures containing polymers known to be poorly biodegradable (PET), show little or no growth. The larger bacterial population found in the cultures containing the polymers of the present invention indicates that the bacteria can utilize the polymer as a source of carbon for cellular processes. The blank (which is not zero) represents a background level of bacteria. Values above this level indicate growth on the polymer.

What is claimed is:

1. A thermoplastic polyester having repeating units represented by the formula:

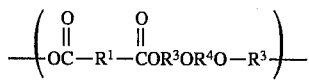

wherein $R^1$ is a hydrocarbylene substituted with at least one hydroxyl group, optionally in combination with an unsubstituted aromatic moiety or an unsubstituted hydrocarbylene; $R^3$ is

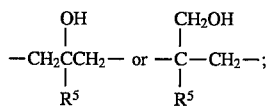

and $R^4$ is

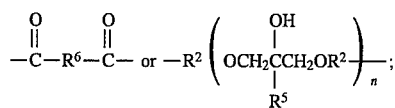

wherein $R^2$ is independently a divalent aromatic moiety or a hydrocarbylene; $R^5$ is independently hydrogen or lower alkyl; $R^6$ is a divalent aromatic moiety, or a hydrocarbylene optionally substituted with at least one hydroxyl group; and n is from 0 to 10.

2. The polyester of claim 1 wherein $R^1$ is independently (1) alkylene, cycloalkylene, alkenylene, alkyleneoxyalkylene, alkylenethioalkylene or alkylenesulfonylalkylene, substituted with at least one hydroxyl group and, optionally, combined with (2) arylene, alkylenearylene, dialkylenearylene, diaryleneketone, diarylenesulfone, diarylenesulfoxide, alkylidene-diarylene, diarylene oxide or diarylene sulfide; or another alkylene, cycloalkylene, or alkenylene, alkenylene, alkyleneoxyalkylene, alkylenethioalkylene or alkylenesulfonylalkylene.

3. The polyester of claim 1 wherein $R^1$ is independently hydroxymethylene, hydroxyethylene, dihydroxyethylene, hydroxypropylene, dihydroxypropylene, trihydroxypropylene, hydroxymethylethylene, hydroxybutylene, dihydroxybutylene, trihydroxybutylene, or tetrahydroxybutylene.

4. The polyester of claim 3 wherein $R^1$ is hydroxyethylene or dihydroxyethylene.

5. The polyester of claim 1 wherein $R^2$ is independently (1) arylene, alkylenearylene, dialkylenearylene, diaryleneketone, diarylenesulfone, diarylenesulfoxide, alkylidene-diarylene, diarylene oxide, diarylene sulfide, or (2) alkylene, cycloalkylene alkenylene, alkyleneoxyalkylene, alkylenethioalkylene, or alkylenesulfonylalkylene.

6. The polyester of claim 1 wherein $R^2$ is independently m-phenylene, p-phenylene, naphthylene, diphenylene-isopropylideneethylene, propylene, butylene, hexylene, octylene, decylene, or cyclohexylene.

7. The polyester of claim 1 wherein $R^6$ is (1) arylene, alkylenearylene, dialkylenearylene, diaryleneketone, diarylenesulfone, diarylenesulfoxide, alkylidene-diarylene, diarylene oxide, diarylene sulfide, or (2) alkylene, cycloalkylene, alkenylene, alkyleneoxyalkylene, alkylenethioalkylene, or alkylenesulfonylalkylene, optionally substituted with at least one hydroxyl group.

8. The polyester of claim 1 wherein $R^6$ is m-phenylene, p-phenylene, naphthylene, diphenylene-isopropylidene, ethylene, propylene, butylene, hexylene, octylene, decylene, cyclohexylene, hydroxyethylene, dihydroxyethylene, hydroxypropylene, dihydroxypropylene, trihydroxypropylene, hydroxymethylethylene, hydroxybutylene, dihydroxybutylene, trihydroxybutylene, or tetrahydroxybutylene.

9. The polyester of claim 1 wherein $R^5$ is hydrogen.

10. The polyester of claim 1 wherein n is from about 0 to 1000.

11. The polyester of claim 1 wherein n is from about 0 to 10.

12. The polyester of claim 1 prepared by reacting a hydroxy-functional aliphatic dicarboxylic acid, optionally in combination with another diacid, with a diglycidyl ether or diglycidyl ester, in the presence of an onium catalyst.

13. The polyester of claim 1 prepared by reacting bisphenol A diglycidyl ether and a mixture of isophthalic and tartaric acids.

14. The polyester of claim 2 prepared by reacting bisphenol A diglycidyl ether and a 1:1 to 9:1 molar ratio mixture of isophthalic and tartaric acids.

15. The polyester of claim 1 in the form of a biodegradable molded or foamed article, container, film or coating.

* * * * *